US006134273A

United States Patent [19]

Wu et al.

[11] Patent Number: 6,134,273

[45] Date of Patent: Oct. 17, 2000

[54] BIT LOADING AND RATE ADAPTATION ON DMT DSL DATA TRANSMISSION

[75] Inventors: Song Wu, Plano; Yaqi Cheng, Richardson; Dennis G. Mannering, Garland, all of Tex.

[73] Assignee: Texas Instruments Incorporated, Dallas, Tex.

[21] Appl. No.: 08/996,731

[22] Filed: Dec. 23, 1997

Related U.S. Application Data

[60] Provisional application No. 60/033,429, Dec. 23, 1996.

[51] Int. Cl.[7] .............................. H04K 1/10; H04L 27/28

[52] U.S. Cl. ........................... 375/261; 375/298; 375/340

[58] Field of Search .................................... 375/222, 259, 375/260, 225, 219, 324, 261, 279, 280, 281, 298, 340; 370/522, 525–527; 329/304; 332/103

[56] References Cited

U.S. PATENT DOCUMENTS 5,751,741 5/1998 Voith et al. ............................ 371/37.7

*Primary Examiner*—Tesfaldet Bocure
*Assistant Examiner*—Jean B Corrielus
*Attorney, Agent, or Firm*—Warren L. Franz; Wade James Brady, III; Frederick J. Telecky, Jr.

[57] ABSTRACT

A method to estimate the bit loading on each tone of a DMT digital subscriber loop system is disclosed. A generic bit-mapping table is given for different sizes of constellations to save memory space.

4 Claims, 3 Drawing Sheets

$xg_n =$

TRANSMITTER $x1/g_n =$

RECEIVER

| fe | f6 | ee | e6 | de | d6 | ce | c6 | c8 | d0 | d8 | e0 | e8 | f0 | f8 | fc |
|---|---|---|---|---|---|---|---|---|---|---|---|---|---|---|---|
| fa | c2 | ba | b2 | aa | a2 | 9a | 92 | 94 | 9c | a4 | ac | b4 | bc | c0 | f4 |
| f2 | be | 8e | 86 | 7e | 76 | 6e | 66 | 68 | 70 | 78 | 80 | 88 | 8c | b8 | ec |
| ea | b6 | 8a | 62 | 5a | 52 | 4a | 42 | 44 | 4c | 54 | 5c | 60 | 84 | b0 | e4 |
| e2 | ae | 82 | 5e | 3e | 36 | 2e | 26 | 28 | 30 | 38 | 3c | 58 | 7c | a8 | dc |
| da | a6 | 7a | 56 | 3a | 22 | 1a | 12 | 14 | 1c | 20 | 34 | 50 | 74 | a0 | d4 |
| d2 | 9e | 72 | 4e | 32 | 1e | e | 6 | 8 | c | 18 | 2c | 48 | 6c | 98 | cc |
| ca | 96 | 6a | 46 | 2a | 16 | a | 2 | 0 | 4 | 10 | 24 | 40 | 64 | 90 | c4 |
| c5 | 91 | 65 | 41 | 25 | 11 | 5 | 1 | 3 | b | 17 | 2b | 47 | 6b | 97 | cb |
| cd | 99 | 6d | 49 | 2d | 19 | d | 9 | 7 | f | 1f | 33 | 4f | 73 | 9f | d3 |
| d5 | a1 | 75 | 51 | 35 | 21 | 1d | 15 | 13 | 1b | 23 | 3b | 57 | 7b | a7 | db |
| dd | a9 | 7d | 59 | 3d | 39 | 31 | 29 | 27 | 2f | 37 | 3f | 5f | 83 | af | e3 |
| e5 | b1 | 85 | 61 | 5d | 55 | 4d | 45 | 43 | 4b | 53 | 5b | 63 | 8b | b7 | eb |
| ed | b9 | 8d | 89 | 81 | 79 | 71 | 69 | 67 | 6f | 77 | 7f | 87 | 8f | bf | f3 |
| f5 | c1 | bd | b5 | ad | a5 | 9d | 95 | 93 | 9b | a3 | ab | b3 | bb | c3 | fb |
| fd | f9 | f1 | e9 | e1 | d9 | d1 | c9 | c7 | cf | d7 | df | e7 | ef | f7 | ff |

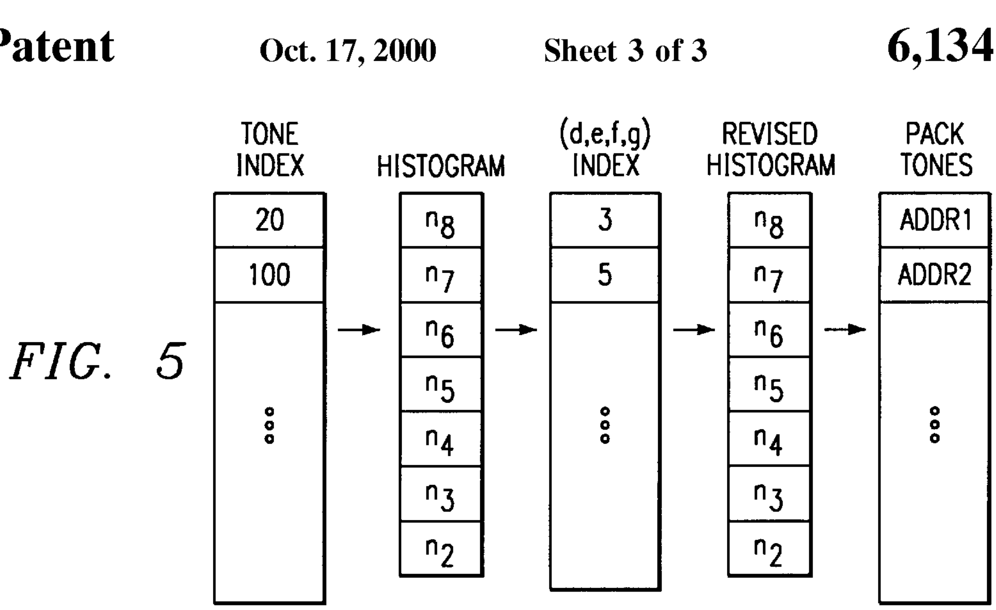
FIG. 5
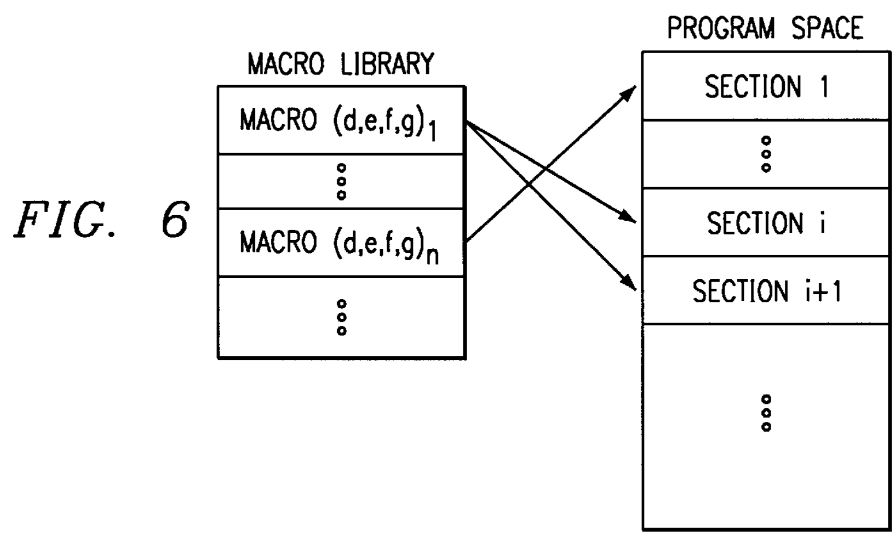
FIG. 6
FIG. 7
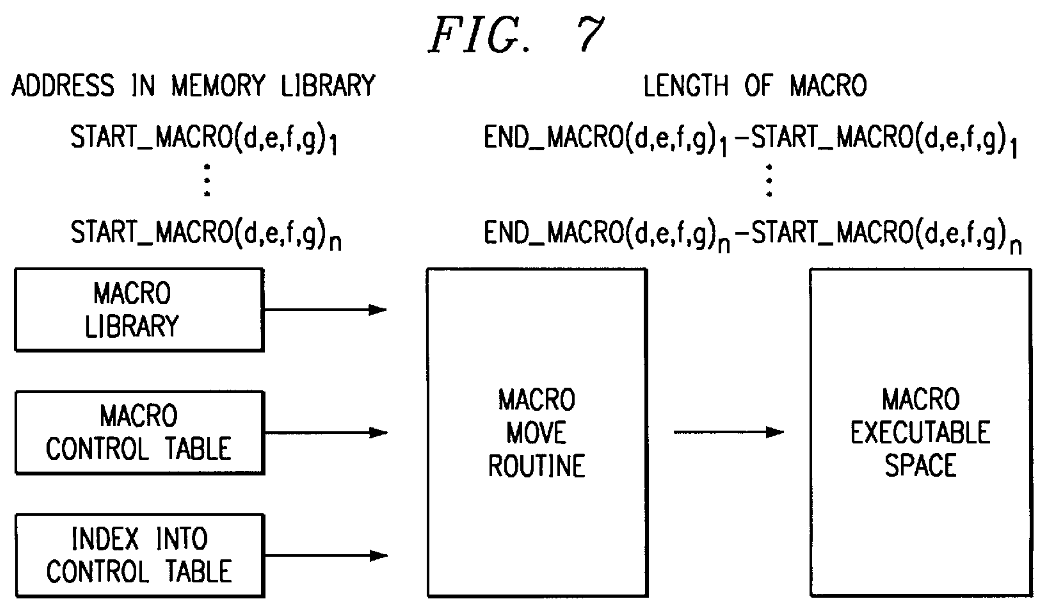

BIT LOADING AND RATE ADAPTATION ON DMT DSL DATA TRANSMISSION

This application claims priority under 35 U.S.C. § 119 (e)(1) of provisional U.S. Ser. No. 60/033,429 filed Dec. 23, 1996, entitled "Bit Loading and Rate Adaptation on DMT MDSL," the entirety of which is incorporated herein by reference.

This invention relates generally to data communications and, in particular, to data transmission over telephone digital subscriber lines.

BACKGROUND OF THE INVENTION

In a discrete multitone (DMT) digital subscriber line data communications system, to maximize the channel utilization the number of bits on each subcarrier has to be optimized based on the subchannel signal-to-noise ratio (SNR). A bit loading algorithm is necessary to adaptively assign the different number of bits to each subcarrier according to the channel condition. The overall data rate depends on this bit assignment and also on the number of subcarriers. During the process of modem initialization, the information on the bit loading of each subcarrier and the total data rate has to be exchanged between the transmitter and receiver.

For practical DSP (digital signal processor) implementations, the system cost is generally determined by the instruction cycles per second and the memory size. Although DMT offers great flexibility and fine granularity, and use of a DSP provides a programmable solution, it still requires a lot of memory space and instruction cycles to practically implement the adaptive bit loading algorithm. The problem comes generally from three aspects. First, since the bit loading algorithm uses many different sizes of constellations, it requires big memory space to store the different bit-mapping tables. For example, it needs 2K words of memory space just for 1024-QAM bit mapping. If constellations have to cover from QPSK to 1024-QAM and bit-mapping tables are different for each constellation, it will require 4K SRAMs in total for the table look-up. Second, as the input to a general purpose DSP is in the format of bytes or words and DMT processes data in blocks, it may need several words of data for one frame of DMT input. However, since the number of bits on each tone is arbitrary, to adaptively load the data, the entire block of DMT data has to keep shifting according to the loading on each tone. Consequently, it consumes a lot of instruction cycles. Third, since the programs for loading different number of bits to a subcarrier are different, to dynamically change bit loading from one subcarrier to another subcarrier may need a lot of conditional subroutine calls and therefore costs a lot of instruction cycles.

SUMMARY OF THE INVENTION

The invention, provides a new method to estimate the number of bits on each tone, and define a generic bit mapping table for different sizes of constellations to save memory space.

The invention also provides a method to group subcarriers together so that the total number of bits supported by this group of subcarriers is equal to one word. In this case, the bit manipulation is limited to one word instead of one block and therefore instruction cycles are saved.

The invention also uses a new dynamic run-time program synthesis technique to relocate a program during execution time to exclude conditional branch and conditional subroutine calls.

BRIEF DESCRIPTION OF THE DRAWINGS

Embodiments of the invention have been chosen for purposes of illustration and description and are described with reference to the accompanying drawings, wherein:

FIG. 5 shows the migration of tables for bit loading.

FIG. 6 is a diagram for program synthesis.

FIG. 7 is a diagram for the run time macro link.

DETAILED DESCRIPTION OF PREFERRED EMBODIMENTS

Figures 1, 2:
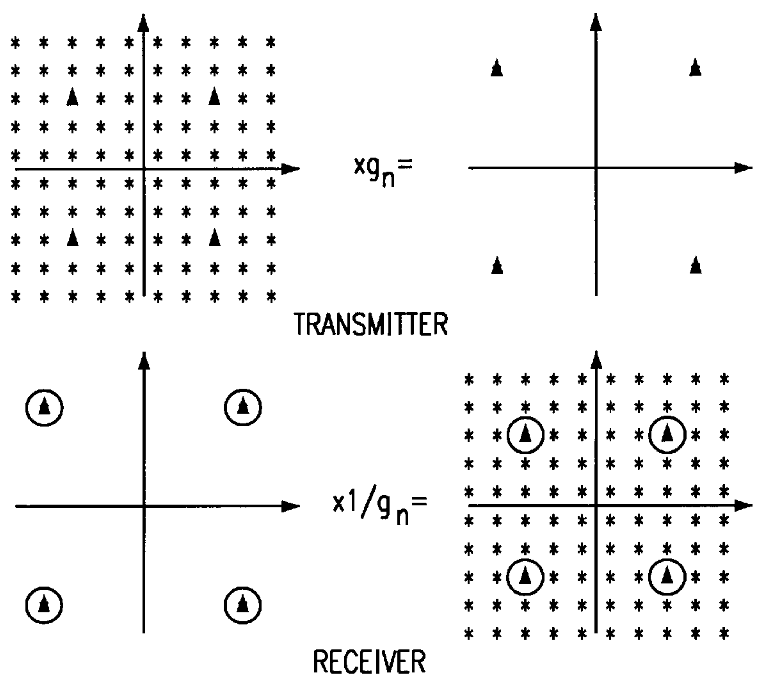
FIG. 1 shows a hexadecimal format bit-mapping table for a DMT system.
FIG. 2 shows a transmitter and receiver gain correction after bit mapping.

Bit mapping and subcarrier bit estimation:

To save memory space, a generic bit-mapping table is defined for DMT systems as shown in FIG. 1. In FIG. 1 the small constellation is nested inside the big constellation for either even or odd number of bits. As the number of bits increases, the constellation expands outward. At the transmitter side, since it requires that all the subcarriers transmit at the same power density level, all different sizes of constellations have to be scaled to the same average power level before transmitting. If we denote $g_n$ as the gain factor to scale the n bits constellation, after the mapping table look-up, the I and Q components have to be multiplied by $g_n$ before being transmitted. At the receiver side, for the same reason as for the transmitter, there is only one generic demapping table. Therefore, the received I and Q components have to be multiplied by a gain correction factor $1/g_n$ before they go to the slicer and demapping table shown in FIG. 2. The gain correction factor $g_n$ has one-to-one correspondence with each size of constellation. Once the constellation gain factor $g_n$ is determined, the number of bits for the constellation is available through table look-up. Table 1 shows the number of $g_n$ normalized to that of 256-QAM, i.e., $g_n/g_8$.

During the channel analysis process of initialization, after the FFT process, the variances of noise on each tone $\sigma(i)$ have been measured. As the data signal, the noise experiences the same gain correction $1/g_n$ before the slicer and demapper. Consequently, at the slicer, the variance of the noise is $\sigma(i)/g_n$. In the following discussion it is assumed that the signal levels in the mapper and the demapper are in the unit of 1, and SNR margin is r for a certain bit error rate depending on the application, i.e., $$\frac{1}{\sigma(i)/g(i)} = \Gamma$$

where $g(i)=\Gamma\cdot\sigma(i)$ is the desired gain factor for subcarrier i. The bigger the g(i), the lower the SNR of subcarrier i. The number of bits that can be supported by the subcarrier i is determined by quantizing the g(i) to $g_n$ and doing table look-up of Table 1.

TABLE 1

| Gain factors for QAM constellations. | | |
|---|---|---|
| n | M-QAM | $g_n$ |
| 2 | QPSK | 9.219544 |
| 3 | 8QAM | 5.322906 |
| 4 | 16QAM | 4.123106 |
| 5 | 32QAM | 2.915476 |
| 6 | 64QAM | 2.011870 |
| 7 | 128QAM | 1.442051 |
| 8 | 256QAM | 1 |

Bit assignment:

After the g(i) estimation of each tone is performed, the tone index can be sorted and tabled in the ascending order of g(i). It is assumed that the sorted tone index table is Index(j) and the sorted g(i) table is G(j), where Index(j) means that the tone Index=i locates at the table position j, and so is the table for G(j). Therefore, g(Index(j))=G(j) and G(j)<G(k) if j<k. The table G(j) can be quantized to $g_n$ in place, i.e. $G(j)=g_n$ if $g_n \leqq G(j) < g_{n+1}$. Since for each number of bits d there is only one corresponding $g_d$ in Table 1, the population of tones with bits d, $n_d$, can be easily calculated. The overall date rate is then determined as $$N = \sum_d n_d \cdot d.$$

Figures 3, 4:
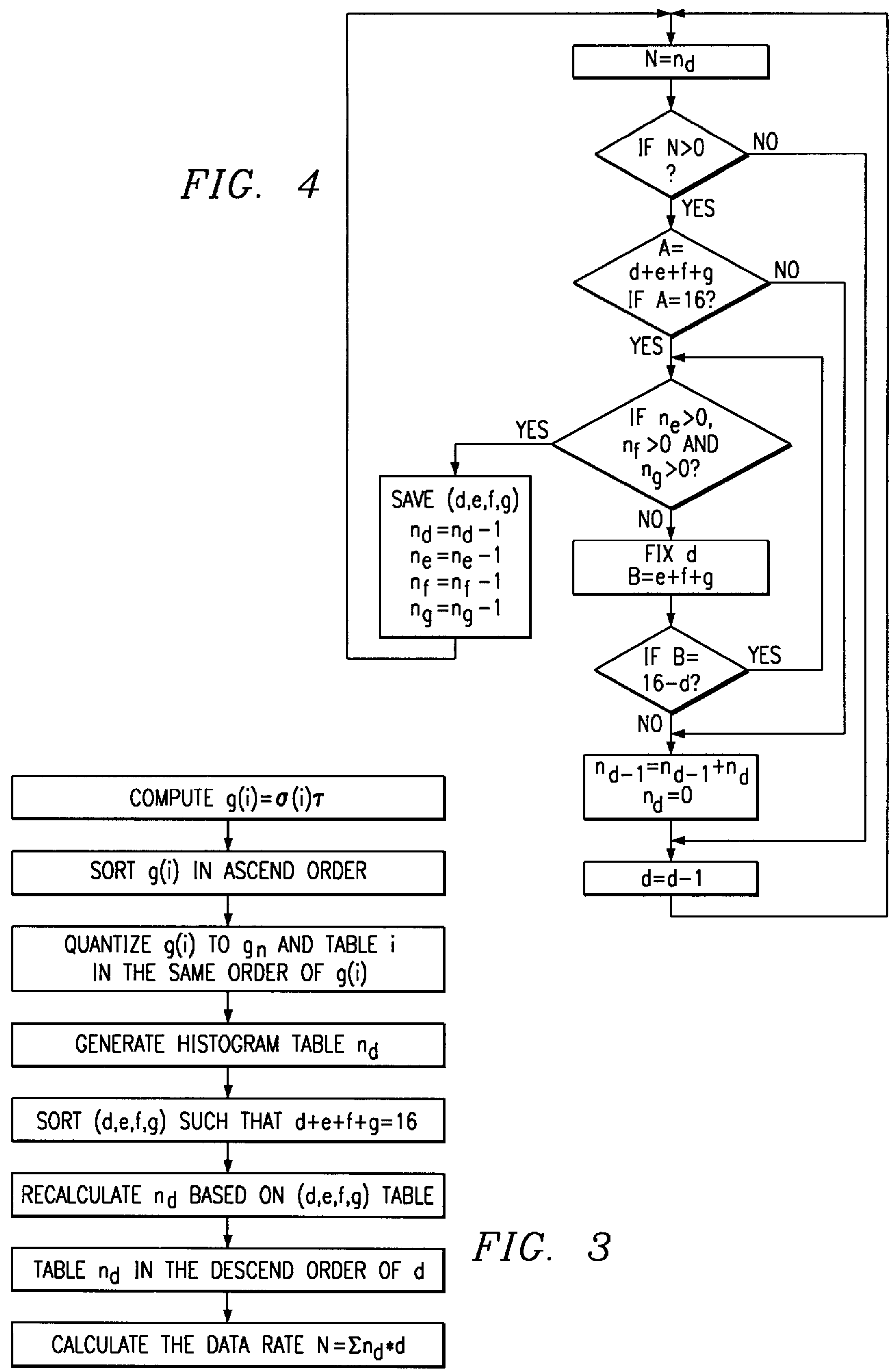
FIG. 3 is a flow chart for bit assignment and rate adaptation.
FIG. 4 is a flow chart for packing tones.

In a DMT system, the input data is read in blocks. For DSP implementation, to load a d bits tone it may require d bits of data block shift. Since shifting an entire data block costs many instruction cycles, for practical implementation several tones are grouped together so that the total bit loading for such group of tones is equal to a word length, e.g., 16. It is easier to shift a word than a block of words. As an example if d, e, f, and g represent the number of bits for different tones, and d+e+f+g=16, then one word of data can be distributed to tones with bits (d,e,f,g). However, since the distribution of number of tones nd on bits d depends on the channel condition, it is not always possible to pack all the tones in the unit of words. Therefore some of the tones have to change their bit rate. Since the data rate on each sub-channel is limited by the channel capacity, it is only possible to lower the data rate, i.e., using a smaller number of constellation points. For example, if a d bits tone can not find its partner, one has to reassign it to d-1 bits and search for a partner again. FIG. 3 gives a flow chart for the above procedure of bit estimation and assignment. Since the distribution of $n_d$ has been changed due to the implementation loss, the final data rate has to be recalculated based on the updated bit distribution of nd.

The detailed flow chart to pack different tones in a word unit is shown in FIG. 4. The program starts at the highest number of bits and searches in descending order. For example for d bits, if there is no tone to support these bits, i.e. $n_d=0$, the searching routine goes to d-1 bits and starts again. If $n_d \neq 0$, then the routine searches for the combination of d+e+f+g=16 with the constraint that $d \geqq e \geqq f \geqq g$. If the combination can not be found for any e, f and g, the program restarts from d-1 bits and moves the population from d bits to d-1 bits, i.e. $n_{d-1}=n_{d-1}+n_d$ and $n_d=0$. If one combination matching (d,e,f,g) has been found, the program checks if the population are available for those tones, i.e. if $n_i>0$, i=d,e,f,g. If it is not true, the program keeps searching for another combination with d unchanged until all the possible e, f, and g have been exhausted. If it is true, it means (d,e,f,g) is a valid combination and saves for future use. Since one valid combination has been found, the population on those bits decrease one, i.e. $n_i=n_i-1$, i=d,e,f,g. The process continues until all the bits have been assigned.

After the process, the histogram nd has to be recalculated and the index of tones has to be rearranged in the order of consecutive (d,e,f,g) sequence as shown in FIG. 5.

Dynamic Run-time Program Synthesis:

After bit assignment, the software for loading each (d,e,f,g) group of tones can be written in macro programs. However, since the order of these macros arranged in the real time has to depend on the line condition, during each initialization process the order of the macros has to be reconfigured. For real time implementation, the conditional branch and subroutine call are excluded due to their cost on instruction cycles. One prefers to use in-line code to save the execution time. Therefore the macro programs have to be placed one after another in the program memory as shown in FIG. 6.

For DMT MDSL applications, during the initialization period there is time to do channel analysis and program editing. However, when the modem runs in the payload time it requires modem running as fast as possible. Therefore during the period between channel analysis ending and payload beginning, the control software can move the macro for each (d,e,f,g) combination to a program space in the order specified during bit assignment process. This process is referred to as "dynamic run-time program synthesis."

The approach is to build a macro library in advance. As shown in FIG. 7, the macro library can consist of a single copy of each macro stored in memory. The library can be stored in random access read only memory (ROM) or in random access read-write memory (RAM). The macro can be absolute (no instruction relocation address need to be modified) or relocatable (instruction relocation addresses need to be modified). In this description the macro is assumed to be absolute. The macro control table has two entries per macro. The first entry is the address of the macro in the macro library and the second entry is the length of the macro. The macro move routine will use an index into the control table to get the control information to move the macro from the control library to the next available space in the macro execution space. The start of the macro execution space may have an area of preamble code which sets pointers and does global initialization for the macros. This code could be preloaded by the assembly and linker/loader.

After all required macros have been moved to the execution space, a subroutine return instruction is appended after the last macro so that the combine macro code can be called as a subroutine from the control program.

If it is difficult to determine when the last macro is built, the macro move routine can insert a subroutine return after each macro that is moved, and then overwrite the return instruction with the next macro is moved.

Macro Library Layout

| |
|---|
| Start_Macro(d,e,f,g)$_1$ |
| macro executable instructions |
| End_Macro(d,e,f,g)$_1$ |
| Start_Macro(d,e,f,g)$_n$ |
| macro executable instructions |
| End_Macro(d,e,f,g)$_n$ |

Those skilled in the art to which the invention relates will appreciate that various substitutions and modifications may be made to the foregoing embodiments, without departing from the spirit and scope of the invention as defined in the claims.

What is claimed is:

1. In a discrete multitone (DMT) digital subscriber loop (DSL) data communications system wherein subchannel bit coding constellation size is selected based on number of bits assigned to a respective subchannel, and a bit loading algorithm is employed to adaptively assign different numbers of bits to different subchannels according to determined subchannel signal-to-noise ratios, a method for data communication comprising:

defining a generic I, Q component, n-bit constellation bit-mapping table, having smaller constellations usable for subchannel lower bit number assignments nested within bigger constellations usable for subchannel larger bit number assignments;

defining respective gain correction factors $g_n$ corresponding to the size constellation to be used for each subchannel bit number assignment;

at the transmitter side, mapping bits of transmission data to subchannels according to table look-up of I, Q components using the generic mapping table;

before transmitting, after mapping table look-up, scaling the obtained I, Q components for each subchannel by multiplying by the gain correction factor $g_n$ corresponding to the number of bits assigned to that subchannel;

defining a generic I, Q component, constellation bit-demapping table, having smaller constellations usable for subchannel lower bit number assignments nested within bigger constellations usable for subchannel larger bit number assignments;

defining respective gain correction factors $1/g_n$ corresponding to size constellation to be used for each subchannel bit number assignment;

at the receiver side, descaling the received I, Q components for each subchannel by multiplying by the gain correction factor $1/g_n$ corresponding to the number of bits assigned to that subchannel; and demapping bits of received data from subchannels after descaling, according to table look-up of I, Q components using the generic demapping table.

2. A method as in claim 1, further comprising:

indexing subcarriers for bit loading according to subchannel bit number assignments to provide respective subchannel groupings having total numbers of bits supported by each grouping which are multiples of words.

3. A method as in claim 2, further comprising using software macros to load bits onto groupings of subchannels.

4. A method as in claim 3, further comprising configuring an order in which the macros are used during a bit assignment initiation process.

* * * * *